Oct. 25, 1955  C. C. MITCHELL  2,721,539
CYLINDER AND PISTON CONSTRUCTION
Filed Feb. 26, 1953
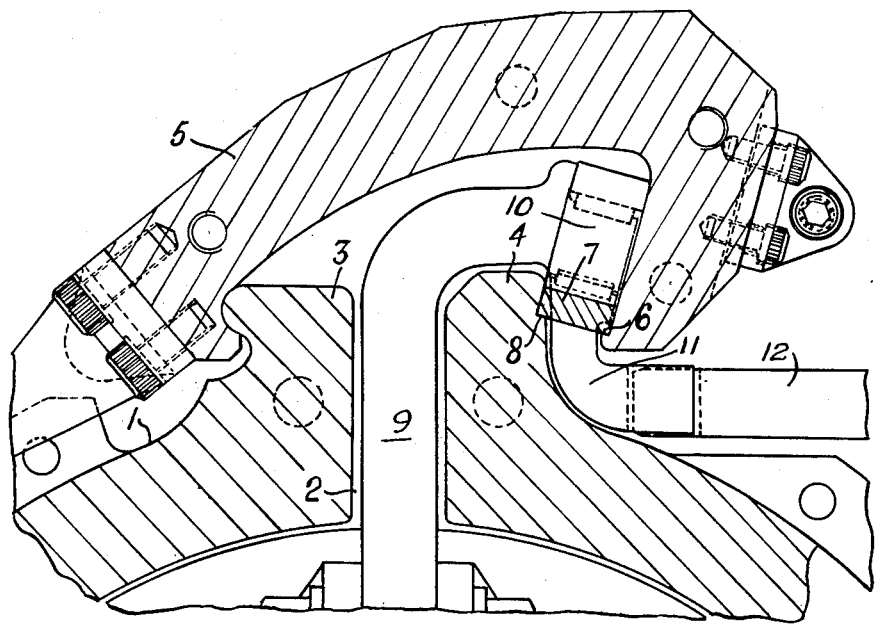
INVENTOR
COLIN C. MITCHELL
BY
Pennie, Edmonds, Morton, Barrows & Taylor
ATTORNEYS

United States Patent Office 2,721,539
Patented Oct. 25, 1955

2,721,539

CYLINDER AND PISTON CONSTRUCTION

Colin C. Mitchell, Edinburgh, Scotland

Application February 26, 1953, Serial No. 338,961

Claims priority, application Great Britain
February 28, 1952

2 Claims. (Cl. 121—1)

This invention relates to a cylinder and piston construction and is a development of the construction described in the specification of Patent No. 2,603,190.

In the specification of Patent No. 2,603,190 there is described a construction including a cylinder, the wall of which is formed with a longitudinal slot, the marginal portions of the wall bounding the slot each presenting a longitudinal flange, one flange edge remote from the slot being provided with a seat or shoulder on which a flexible sealing strip normally rests and a clamp member substantially of C shape in cross section embracing the two shoulders and forming closure or cover for the slot which pivots about the other flange edge, one horn of the clamp member abutting against the unshouldered flange, and the inner edge of the other horn of the clamp member being shouldered to engage one edge of the flexible sealing strip and being spaced from the adjacent flange, the sealing strip bridging the gap between said second-mentioned horn of the clamp member and said checked flange.

In devices in which cylinder and piston constructions of the above type are used, a piston assembly is propelled longitudinally of the cylinder. This piston assembly carries a driving member or iron and also a driving key or actuating member, both of which have portions which protrude through the slot, with the driving key or actuator having means for connecting it to an external member to be driven. The portion of the driving iron which protrudes through the slot extends over the flange at one side of the slot and has an inclined portion beneath which the sealing strip passes and which gradually forces the sealing strip downwardly against the generally horizontal face of the shoulder of the shouldered flange. The foresaid inner edge of one horn of the C-shaped closure member or clamp engages the outer edge of the sealing strip and forces the sealing strip against the vertical face of the shouldered portion to form a seal at that side of the slot. The driving key or actuator precedes the driving iron as the piston assembly moves along the cylinder and has an inclined face along which the sealing strip descends to pass beneath the overhanging portion of the driving iron.

When the sealing strip is positioned horizontally in accordance with the disclosure of my foresaid patent, the pressure within the cylinder tends to swing the cylinder cover or clamp about its pivotal connection with one of the flanges and to blow it from the cylinder. In accordance with the present invention, the tendency for pressure within the cylinder to blow the cover member therefrom is overcome by so positioning the sealing strip that the forces tending to spread the cylinder at the slot and the forces tending to swing the cover about its pivot point and thereby blow it from the cylinder are in equilibrium. This is obtained in the construction according to the present development by inclining the sealing strip outwardly and downwardly at an acute angle to a plane containing the axis of the cylinder and passing through the centre of the slot, and by so forming the flange having the seat or shoulder for the sealing strip and the adjacent horn of the clamp or cover member to receive the inclined sealing strip.

A practical embodiment of the invention is illustrated in the accompanying fragmentary cross-sectional view through the slotted portion of a cylinder.

In the drawing, 1 denotes a cylinder formed with a longitudinal slot 2, the marginal portions of the wall of the cylinder 1 bounding the slot presenting longitudinal flanges 3 and 4. 5 denotes a clamp or cover member, one of the horns of which engages and is pivoted about the flange 3 and the other horn of which is shouldered at 6 to engage one edge of a flexible sealing strip 7. The cover member 5 preferably is substantially C-shaped in transverse cross-section, since such a shape gives the best distribution of the stresses in the material of the cover. The other edge of the sealing strip engages a shoulder or seat 8 in the flange 4. The sealing strip, in transverse section, is inclined outwardly and downwardly at an acute angle to a plane containing the axis of the cylinder and passing through the centre of the slot. The angle which the sealing strip makes with such plane will be determined by the relative position of the pivot point of the cover, the relative vertical position of the bearing faces of the sealing strip with respect to the flange and the cover, as related to the pivot point of the cover, and the width of the cover, that is, the lateral distance between the pivotal point of the cover and the sealing strip faces, but in most instances the inclination will be of the order of that shown in the drawing. 9 denotes the driving iron which is carried by the piston assembly. It has a portion 10 which overhangs the flange 4 and causes the sealing strip 7 to be forced down against the seating shoulders 6 and 8 as the piston assembly is propelled through the cylinder. The driving key, which precedes the driving iron, is behind the driving iron shown in the drawing, but the portion 11 thereof which engages and drives the external member 12 does appear.

In practice, fluid under pressure within the cylinder tends to move the clamp or cover member 5 radially away from the cylinder 1. Such radial force may be resolved into two components, the direction of one of which is transversely of the sealing strip 7. The reaction offered by the sealing strip to said transverse component has a component equal and opposite to the radial force, which latter component resists the tendency for the clamp member 5 to move radially away from the cylinder 1. The resistance of the cylinder 1 to bursting is thus maintained despite the longitudinal slot 2 in the cylinder wall, since the clamp member 5 acting through the strip 7 grips the faces of the upstanding flanges 3 and 4 remote from the slot 2 and prevents the flanges 3 and 4 from moving away from one another. Also, when the sealing strip is inclined downwardly and outwardly, as described above, the forces exerted by the gas in the cylinder which tends to spread or open up the cylinder at the slot, and the forces tending to swing the cover about its pivotal point with the flange 3 and thus blow it from the cylinder are in equilibrium and the cover remains in place and an effective sealing of the cylinder is obtained.

What is claimed is:

1. In a cylinder and piston construction including a cylinder, the wall of which has a longitudinal slot in which an actuating member operated by the piston moves, a pair of outstanding longitudinal flanges extending lengthwise of the cylinder and bounding the edges of the slot, a clamping or cover member extending longitudinally over the slot and having a portion thereof at one side bearing against one flange for pivotal movement thereabout, a sealing strip, the other flange being shouldered to form a seat for one side of the sealing strip and the clamp or cover member having a shouldered portion for engaging the other side of the sealing strip, the improvement in which the shouldered portions of the clamping or cover member and of said other flange are so positioned with respect to one another that when the sealing strip lies on them in sealing position, the sealing strip inclines outwardly and downwardly from a plane containing the axis of the cylinder and passing through the center of the slot.

2. A cylinder and piston construction as defined in claim 1, the further improvement in which the clamp or cover member is substantially C-shaped in transverse cross-section and the sealing strip inclines outwardly and downwardly at an angle such that the forces tending to spread the cylinder at the slot and the forces tending to swing the cover about its pivot and thereby blow it from the cylinder are in equilibrium.

References Cited in the file of this patent

UNITED STATES PATENTS

| | | |
|---|---|---|
| 2,603,190 | Mitchell | July 15, 1952 |
| 2,633,266 | Cookson | Mar. 31, 1953 |

FOREIGN PATENTS

| | | |
|---|---|---|
| 132,898 | Switzerland | July 16, 1929 |